(12) United States Patent
Shiono et al.

(10) Patent No.: US 7,762,600 B2
(45) Date of Patent: Jul. 27, 2010

(54) VEHICLE INTERIOR DOOR PULL HANDLE ATTACHMENT METHOD AND APPARATUS

(75) Inventors: Tatsuya Shiono, Dublin, OH (US); Tami Redinger, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 83 days.

(21) Appl. No.: 12/266,131

(22) Filed: Nov. 6, 2008

(65) Prior Publication Data
US 2009/0121515 A1 May 14, 2009

Related U.S. Application Data

(60) Provisional application No. 60/986,418, filed on Nov. 8, 2007.

(51) Int. Cl.
*B60J 5/00* (2006.01)
(52) U.S. Cl. ...................... 296/1.02; 296/153
(58) Field of Classification Search ............. 296/1.02, 296/152, 153, 146.7
See application file for complete search history.

(56) References Cited

U.S. PATENT DOCUMENTS

| | | | |
|---|---|---|---|
| 4,929,017 A * | 5/1990 | Lilienthal et al. | 296/153 |
| 5,462,482 A | 10/1995 | Grimes | |
| 5,865,496 A | 2/1999 | Odan et al. | |
| 6,149,224 A | 11/2000 | Tiberia et al. | |
| 6,612,641 B2 * | 9/2003 | Schutt et al. | 296/152 |
| 6,616,216 B2 | 9/2003 | Furuyama et al. | |
| 6,899,373 B2 | 5/2005 | Kim | |
| 7,111,894 B2 | 9/2006 | Kora et al. | |

FOREIGN PATENT DOCUMENTS

EP 1504939 A1 2/2005

\* cited by examiner

*Primary Examiner*—Joseph D Pape
(74) *Attorney, Agent, or Firm*—Mark E. Duell; Rankin, Hill & Clark LLP

(57) ABSTRACT

The invention is directed to an apparatus and method that includes a bracket that attaches the bottom end of a vehicle interior door handle to a door panel in a rigid manner, the bracket including a first wall and second and third walls that extend, generally perpendicular to the door panel, from the first wall toward the door panel, and first and second flanges extending from the second and third walls respectively that are attached to the door panel. The second and third walls flank control components within the armrest such that the bracket is compact and provides a rigid connection.

5 Claims, 4 Drawing Sheets

VEHICLE INTERIOR DOOR PULL HANDLE ATTACHMENT METHOD AND APPARATUS

BACKGROUND OF THE INVENTION

It is common in modern vehicles to include a number of control items upon a vehicle door armrest in order to increase driver or passenger convenience. Such items include door lock switches, power window control switches, side mirror adjustment controls, etc. Also, for the convenience of the driver or passenger, a large pull handle is provided, which the driver or passenger pulls from inside of the vehicle to close their respective door. Often, the arm rest and pull handle are incorporated into a single assembly (LNG), with the bottom end of the pull handle merging into the armrest. As a result, the armrest and pull handle are easier to manufacture and to attach to the vehicle's door panel. Also, when combining the two, a more compact design is provided which does not overly clutter the interior surface of the vehicle door.

A preferred door pull handle is rigidly attached to the vehicle door panel. Thus, when the vehicle driver or passenger pulls on the handle, there is minimal play or give, and an impression of a well constructed, high quality vehicle is provided. When the door handle is not rigidly attached to the door panel, the door panel and/or pull handle typically flexes (gives) slightly before the door moves in response to the force applied by the vehicle occupant. This flexing or play provides an impression that the materials or construction of the vehicle may not be of superior quality.

The best way to provide a rigid connection from the door pull handle to the door panel is to place a fastener through the handle at each end, in a direction perpendicular to the door panel. However, within a handle and armrest combination, the bottom end of the pull handle is often aligned with controls that are embedded within the armrest. Because a fastener cannot pass through these components, the attaching position is usually offset from the bottom of the pull handle to a different position on the armrest, using a bracket, where there are no restrictions. Unfortunately, the distance added by known offset brackets results in a loss of rigidity, allowing the door handle and bracket, between attachment points, to flex to a greater degree. The impression of a superior product given when the handle is pulled is lost in this instance.

To avoid such a situation, the vehicle styling must be changed to re-locate the components in the armrest. This is not desirable. What is desired is a way to maintain a rigid connection between the door pull handle and door panel in a door pull handle and armrest system including control components.

BRIEF SUMMARY OF THE INVENTION

An improved method and apparatus for attaching the door pull handle to the door panel is provided and includes using a bracket including walls that flank the control components (switches, etc.) that are embedded within the vehicle armrest. The bracket includes a first wall that is spaced apart from and is generally parallel to the door panel. Second and third walls extend from opposite ends of the first wall toward the door panel and are also generally perpendicular to the door panel. A first flange extends from an end of the second wall opposite from the end adjacent to the first wall. Similarly, a second flange extends from the end of the third wall opposite to the end adjacent to the first wall. The first and second flanges are connected to the door panel using fasteners. The first wall is attached to the pull handle using a fastener.

The improved bracket, and method for attaching the bracket, of the present invention provide superior rigidity in the joint between the pull handle and door panel because first, a fastener passes through the door pull handle near its bottom. Secondly, because the size of the bracket, namely represented by the length of the second and third walls, is minimized, (i.e. the second and third walls minimize the distance between the door panel and the first wall of the bracket) any flexing of the bracket itself is negated and overall play in the pull handle is minimized.

These and other features, aspects, and advantages of the present invention will be fully described by the following description, appended claims, and accompanying drawings.

DETAILED DESCRIPTION OF THE INVENTION

Figure 1:
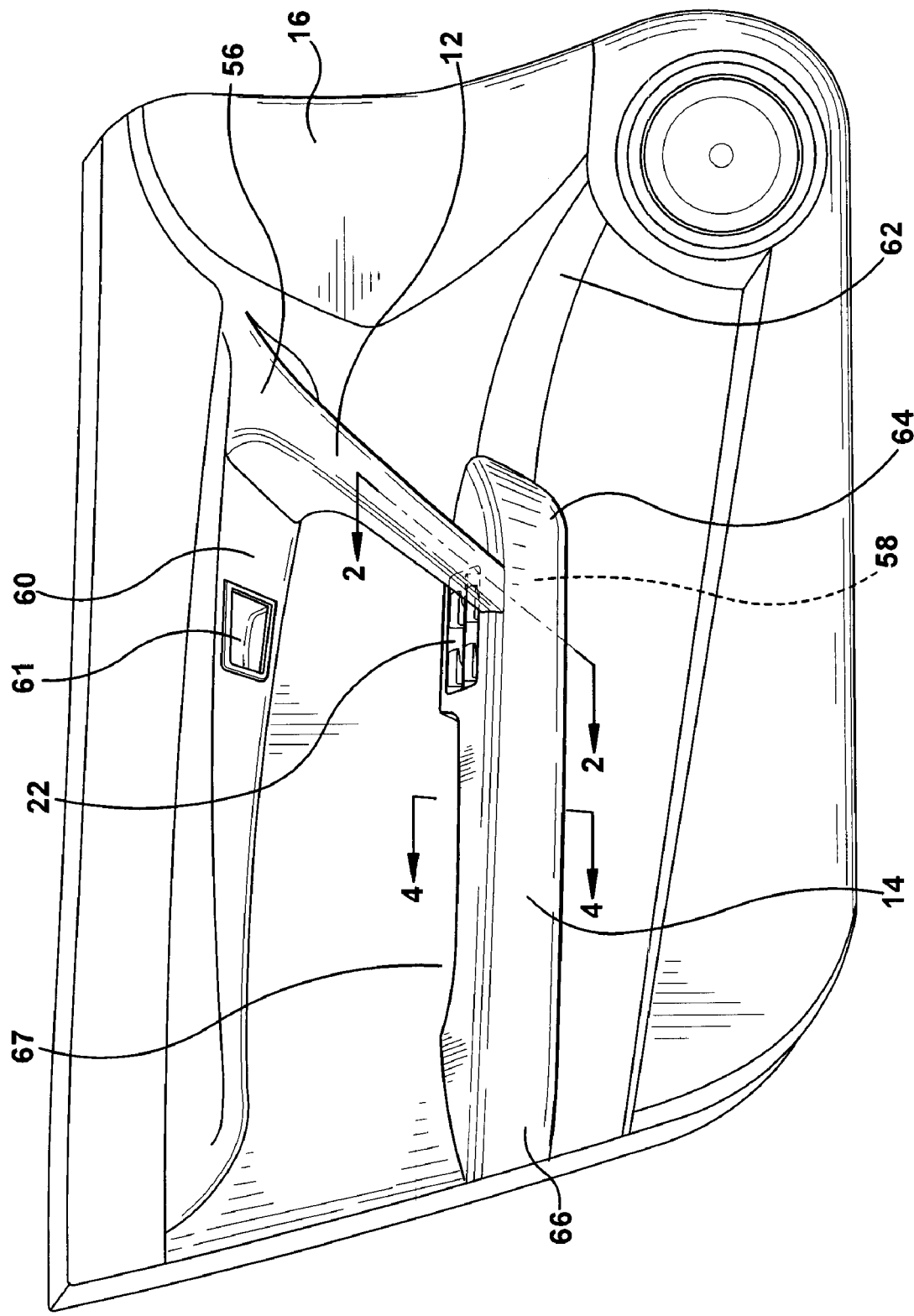
FIG. 1 is a side view of an interior door panel of a vehicle with an integrated pull handle and armrest attached thereto.
Figure 2:
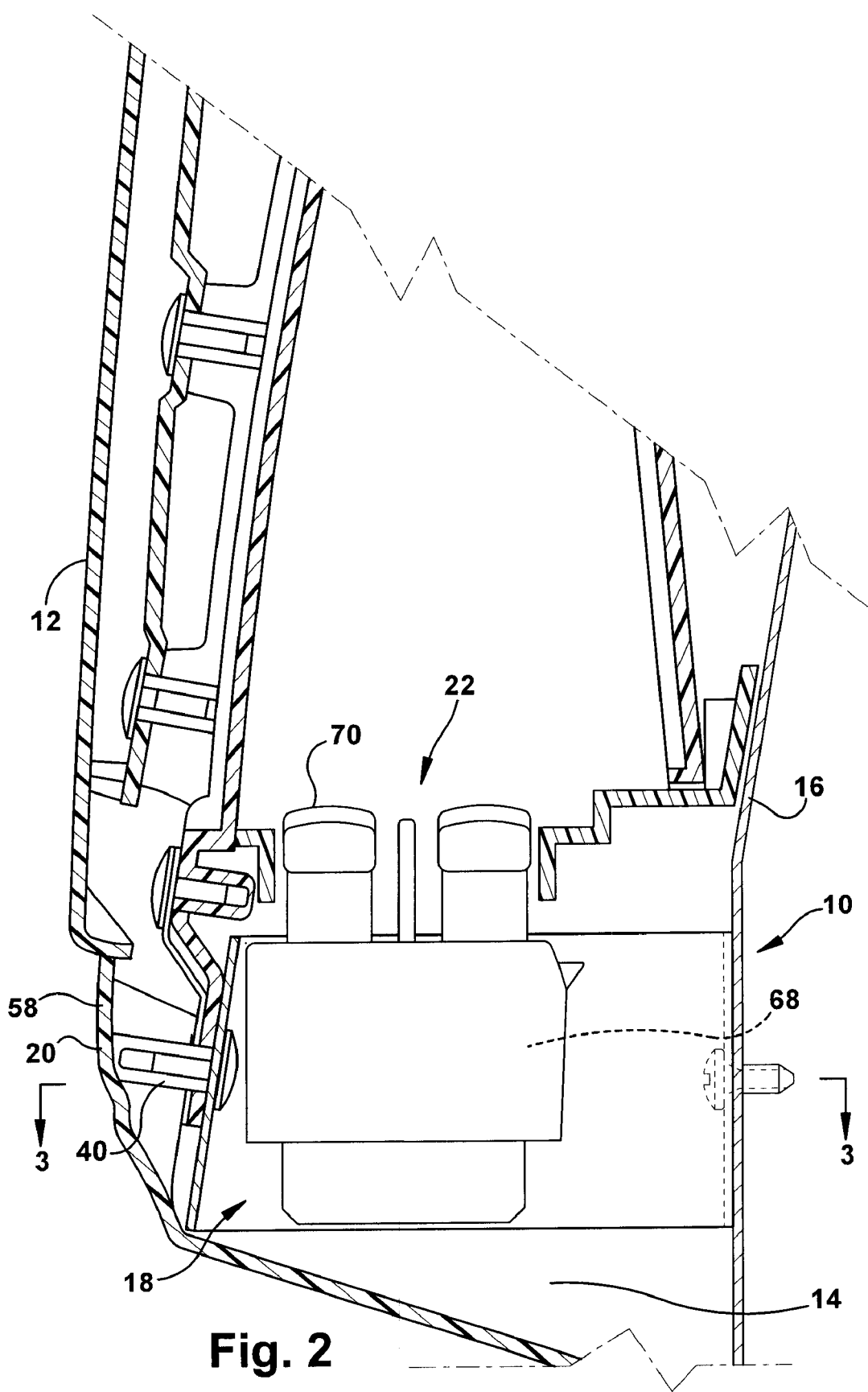
FIG. 2 is a cross-sectional view of the pull handle, armrest, door panel and control components.
Figure 3:
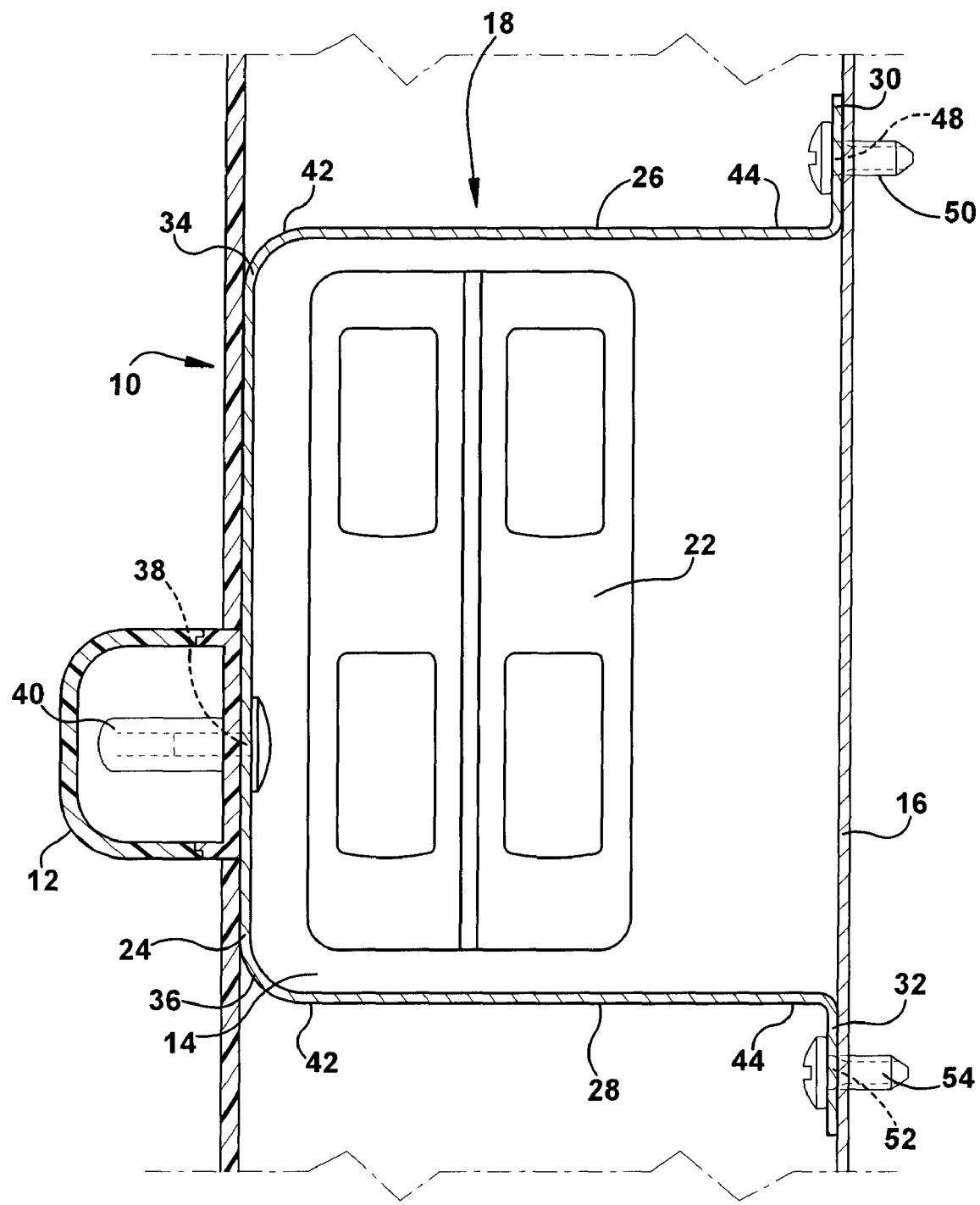
FIG. 3 is an alternative cross-sectional view of the door handle, bracket, door panel and control components as seen in FIG. 2.
Figure 4:
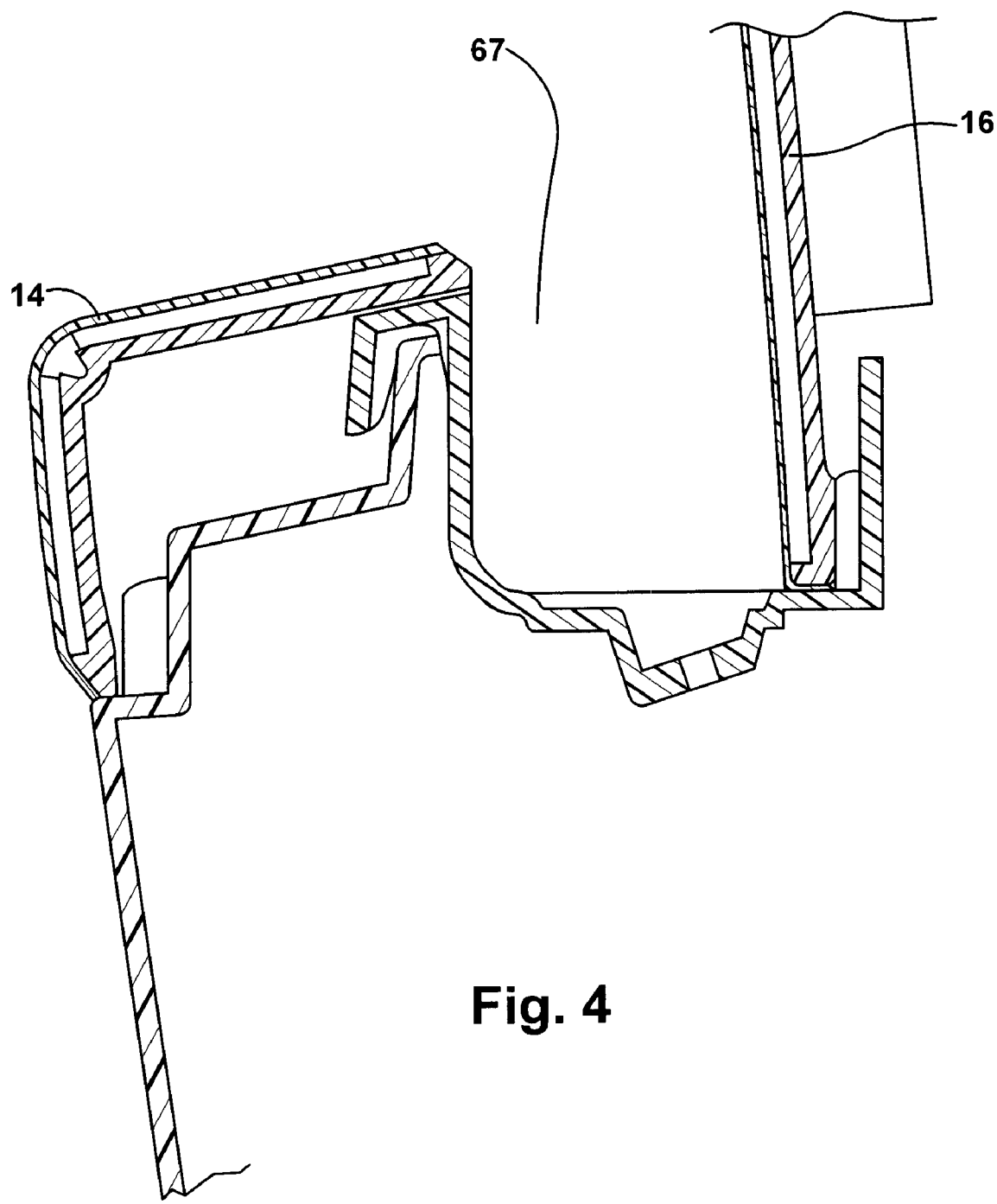
FIG. 4 is yet another alternate cross-sectional view, showing only the door handle, and door panel.

Referring to the drawings, specifically FIGS. 1-3, a preferred attachment system 10 for providing a rigid connection between a vehicle interior door pull handle 12, that is integrated into a vehicle armrest 14 at its bottom, and door panel 16 is illustrated. As described in more detail below, the system includes a bracket 18 that is attached to the bottom end 20 of the door pull handle 12, wherein the bracket 18 avoids contact with any control components 22 within the armrest 14.

Herein, the term door panel refers to a structural support member within the vehicle door in combination with a decorative cover that is placed on the interior surface of the structural support member. However, door panel could also be a single structural member with no decorative cover or a single member that has both structural and decorative qualities.

Referring to FIGS. 2 and 3, the bracket 18 is made from a single piece of material, formed to have first 24, second 26 and third 28 walls and first 30 and second 32 flanges. The first wall 24 is flat, rectangular, and is located between the second and third walls 26 and 28. The first wall 24 has a first end 34 and a second end 36 and defines an aperture 38 approximately half way between the first and second ends 36 and 38 for receiving a fastener 40. When the bracket 18 is installed, preferably the first wall 24 is generally parallel to the door panel 16, however, depending upon the shape of the arm rest, the first wall 24 may be slightly angled as shown in FIG. 2.

The second and third walls 26 and 28 are generally parallel to one another and generally perpendicular to the first wall 24, again depending on the arm rest shape. The second and third walls 26 and 28 are also rectangular and have a height that is equal to the first wall 24. Each one of the second and third walls 26 and 28 have a proximal end 42 and a distal end 44, wherein the proximal end 42 of each joins with the first wall 24.

A first flange 30 extends from the distal end 44 of the second wall 26 in a direction that is the opposite of the direction the first wall 24 extends from the proximal end 42. The first flange 30 is generally flat and rectangular and defines an aperture 48 therein for receiving a fastener 50. Similarly, a second flange 32 extends from the distal end 44 of the third wall 28 in a direction opposite of the direction the first wall 24 extends from the proximal end 42. The flange 32 is generally flat and rectangular and defines an aperture 52 therein for receiving a fastener 54.

The bracket 18 is preferably made from steel.

Referring to FIGS. 1 and 2, the door pull handle 12 is illustrated and includes a top end 56 and a bottom end 58. The top end 56 merges into a transverse decorative assembly portion 60 of the door panel 16 that includes, for example, a light assembly 61 therein. The pull handle 12 is spaced, at its mid-section, from the door panel 16 when the pull handle 12 is attached thereto. The pull handle 12 is angled at approximately 45 degrees from vertical when the handle 12 is attached to the door panel 16. The pull handle 12 is preferably made from a hard plastic frame surrounded by a soft plastic cover. Foam is preferably placed between the frame and cover to provide comfort when the handle 12 is gripped. At its bottom end 58, the door pull handle 12 is integrated into the vehicle armrest 14.

The armrest 14 is a generally rectangular solid that is generally horizontal when attached to the door panel 16. The armrest 14 also includes a narrow tapered forward extension 62 that bends downwardly. The armrest 14 solid portion includes a forward end 64 and rear end 66 which are wider than the extension 62 and support the vehicle operator's arm when desired. Within the forward end 64 of the armrest 14, a series of control components 22 are supported. The components 22 may include switches, touch surfaces, lights, rheostats, etc. Preferably, the control components 22 include a control portion 68 that is embedded within the armrest 14 and a touch portion(s) 70 that protrudes from the armrest 14 and which is contacted by the vehicle operator. The control portion 68 of the components is preferably held within a generally rectangular housing. The control components 22 are used to control vehicle door locks, power windows, mirrors, etc.

The rear end 66 of the arm rest 14 is generally flat and is cushioned for comfortable support of the operators arm. The arm rest defines a pull pocket 67 that can be used for closing the door. The door panel 16 is generally rectangular and has a shape similar to the vehicle door. The door panel 16 preferably includes a portion made from rigid plastic.

Referring to FIGS. 1-4, the vehicle is assembled by attaching the door panel 16 to the vehicle door. The armrest 14 and door pull handle 12 are attached as an assembly to the door panel 16. The armrest 14 is held to the door panel 16 by a series of clips and screws. The screwed connections provide the strength required to support the weight of the vehicle operators arm when resting thereon. The clips simply hold more decorative portions in place against the door panel 16. A screw connection is provided at least at the rear end 66 and front end 64 of the armrest.

The bracket 18 is preferably molded into the armrest 14.

The door pull handle 12 is screwed to the door panel 16 at its top end 56 and bottom end 58. At its top end 56, a screw is directed through the door handle 12 in a direction perpendicular to the door panel 16. At the bottom end 58, the bracket 18 is connected to the door panel 16 by two screws 50 and 54. A first screw 50 is inserted through the aperture 48 in the first flange 30 and into the door panel 16 in a direction perpendicular to the door panel 16. A second screw 54 is inserted through the aperture 52 in the second flange 32 and into the door panel 16 in a direction perpendicular to the door panel 16. An additional screw 40 is then placed through the bottom end 58 of the door handle 12 and the aperture 38 in the first wall 24 of the bracket 18 in a direction generally perpendicular to the first wall 24.

Alternatively, the connections made using screws may be made using clips, bolts, or other types of fasteners. The bracket may be used alternatively to avoid other obstructions such as reinforcement structures within the armrest, ashtrays, or audio speakers. The fasteners that are attached to the door panel may alternatively be attached to other structural members of the door.

A primary advantage of the present apparatus and method is the ability to provide a rigid connection between the interior door pull handle and the door panel without having to move the location of control components on or within the armrest. Additionally, the present apparatus negates the need to provide additional attachment points that are in unusual places on the armrest that are either unsightly and/or difficult to place fasteners into. The bracket of the present invention also provides protection for the control components from damage caused by impacting the side of the armrest.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A vehicle interior door pull handle attachment system comprising:
    a vehicle interior door panel;
    a generally horizontal armrest attached to the door panel and supporting an electronic control component that is at least partially enclosed therein;
    a door pull handle having a top end and a bottom end, the door pull handle extending upward from the armrest and attached at the top end to the door panel; and
    a bracket for attaching the bottom end of the door pull handle to the door panel; the bracket including:
        a first wall, having a first end and a second end, and being attached between the first end and second end to the bottom end of the door pull handle;
        a second wall having a proximal end adjacent to the first wall, and a distal end, the second wall extending, generally perpendicular to the door panel, from the first end of the first wall toward the door panel;
        a third wall having a proximal end, adjacent to the first wall, and a distal end, the third wall extending, generally perpendicular to the door panel, from the second end of the first wall toward the door panel;
        a first flange extending from the distal end of the second wall in a direction generally parallel to the door panel, the first flange attached to the door panel;
        a second flange extending from the distal end of the third wall in a direction generally parallel to the door panel, the second flange attached to the door panel;
    wherein the second and third walls flank opposite sides of the electronic control component, thus, providing a rigid connection between the door handle and door panel.

2. The attachment system of claim 1, wherein the first flange extends from the second wall in a direction away from the electronic control component and the second flange extends from the third wall in a direction away from the electronic control component.

3. The attachment system of claim 1, wherein the electronic control component includes a switch that controls vehicle power windows.

4. The attachment system of claim 1, including an additional electronic control component is configured with at least a first electronic control switch embedded within the armrest and a touch portion protruding from the arm rest.

5. A method for rigidly attaching a vehicle interior door handle to a vehicle interior door panel even though a control component blocks a direct connection path, comprising the steps of:
- providing a bracket including:
  - a first wall having a first end and a second end;
  - a second wall having a proximal end adjacent to the first wall, and a distal end, the second wall extending away from the first end of the first wall;
  - a third wall having a proximal end adjacent to the first wall, and a distal end, the third wall extending away from the second end of the first wall;
  - a first flange extending from the distal end of the second wall;
  - a second flange extending from the distal end of the third wall;
- attaching an armrest to a vehicle interior door panel, the armrest supporting an electronic control component that is at least partially enclosed therein;
- attaching a top end of a door pull handle to the interior door panel and attaching a bottom end of the door pull handle to the first wall of the bracket;
- flanking opposite sides of the electronic control switch with the second and third walls of the bracket such that the second and third walls of the bracket are perpendicular to the door panel; and
- attaching the first and second flanges of the bracket to the interior door panel.

* * * * *